(12) United States Patent
Nakama et al.

(10) Patent No.: US 7,340,131 B2
(45) Date of Patent: Mar. 4, 2008

(54) COLLIMATOR AND OPTICAL FILTER DEVICE USING THE SAME

(75) Inventors: Kenichi Nakama, Tokyo (JP); Naoko Hikichi, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 11/552,247

(22) Filed: Oct. 24, 2006

(65) Prior Publication Data

US 2007/0110366 A1 May 17, 2007

(30) Foreign Application Priority Data

Nov. 11, 2005 (JP) ............................ P2005-327700

(51) Int. Cl.
*G02B 6/32* (2006.01)
(52) U.S. Cl. ............................ 385/34; 385/27; 385/31; 385/32; 385/39
(58) Field of Classification Search ............... 385/27, 385/31–34, 39, 50
See application file for complete search history.

(56) References Cited

U.S. PATENT DOCUMENTS

2004/0120717 A1* 6/2004 Clark et al. .................. 398/118

2005/0094952 A1* 5/2005 Gonthier et al. ............ 385/100

FOREIGN PATENT DOCUMENTS

| JP | A-62-75606 | 4/1987 |
| JP | A-11-326210 | 11/1999 |

* cited by examiner

*Primary Examiner*—Frank G. Font
*Assistant Examiner*—Michael P. Mooney
(74) *Attorney, Agent, or Firm*—Whitham Curtis Christofferson & Cook, P.C.

(57) ABSTRACT

It is a collimator adapted to convert divergent light beams outputted from an optical fiber bundle to parallel light beams through a collimator lens. A large diameter optical fiber is disposed between an optical fiber bundle, which is a bundle of a large number of multimode optical fibers and serves as one optical transmission path, and a collimator lens. A cross-section of the core of the large diameter optical fiber is larger than a range in which the cores of the optical fibers of the optical fiber bundle are present. Also, a group of divergent light beams outputted from the optical fibers of the optical fiber bundle is converted by the large diameter optical fiber to one light beam.

12 Claims, 4 Drawing Sheets

FIG. 3A
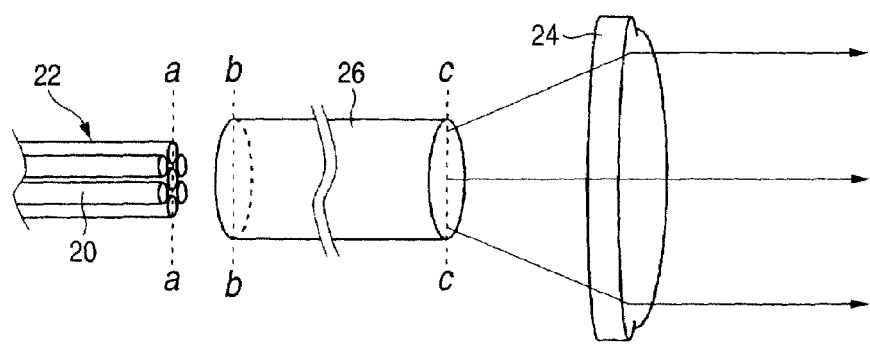
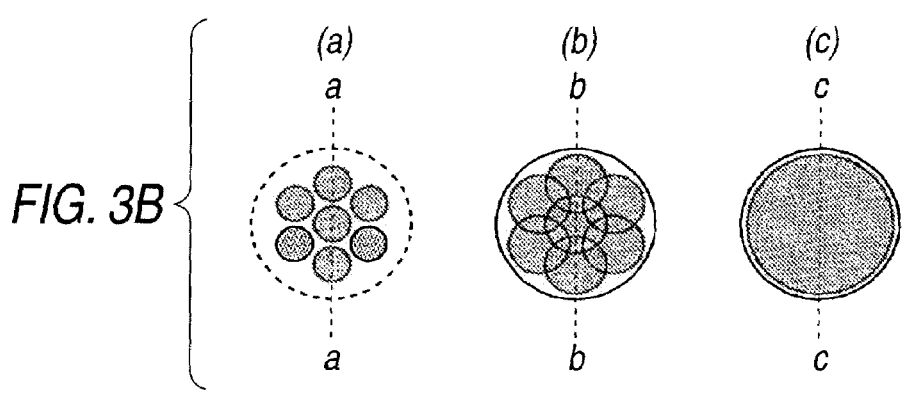
FIG. 3B
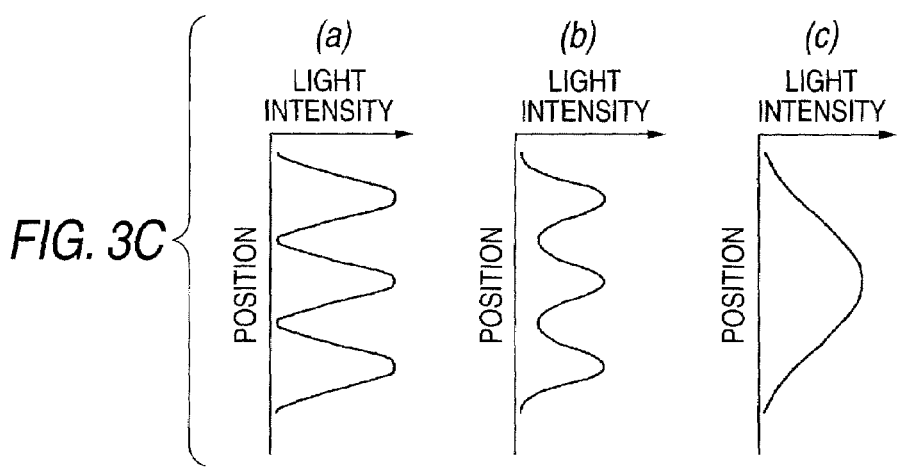
FIG. 3C

COLLIMATOR AND OPTICAL FILTER DEVICE USING THE SAME

BACKGROUND OF THE INVENTION

1. Field of the Invention

The present invention relates to a collimator adapted to convert divergent light beams outputted from each of optical fibers of an optical fiber bundle to parallel light beams through a collimator lens. More particularly, the invention relates to a collimator having a structure in which a large diameter optical fiber is disposed between the collimator lens and an optical fiber bundle obtained by tying a large number of multimode optical fibers in a bundle serving as a single optical transmission path, and also relates to an optical filter device incorporating the collimator at an incident side thereof, and to an optical measuring apparatus incorporating the collimator at an incident side thereof.

2. Related Art

An optical fiber collimator is a device adapted to convert divergent light beams outputted from an optical fiber 10 to parallel light beams through a collimator lens 12, as shown in FIG. 6A. The optical fiber collimator obtains parallel light beams by placing a light output end face of the optical fiber 10 at a focal position of the collimator lens 12. Such an optical fiber collimator is widely used, for example, in a case where various optical filters are inserted into a transmission optical system including optical fibers. For instance, in a case where a wavelength selection filter utilizing interference due to dielectric multilayer film is inserted into the transmission optical system including optical fibers, two of the optical fiber collimators are placed opposite to each other and are aligned with each other. Then, an interference film filter is inserted between both the optical fiber collimators (see, for example, JP-A-62-75606). With this configuration, light having been incident upon one of an optical fiber of one of the optical fiber collimators changes in intensity at a predetermined wavelength according to the spectral transmission characteristic of the optical filter and is coupled to an optical fiber of the other optical fiber collimator.

Such an optical fiber collimator has been used without problems in a transmission system using an infrared single-mode optical fiber oramultimode optical fiber, such as a GI50 optical fiber, which are mainly used in optical communication.

Meanwhile, the optical fiber collimator is used in the field of optical measurement. For example, in a fluorescence measurement device adapted to measure and evaluate fluorescence, which is generated by irradiating excitation light onto a substance, an optical filter is used to measure the intensity of fluorescence having a specific wavelength. Thus, a collimating function is needed (see, for instance, JP-A-11-326210). In such a fluorescence measurement device, excitation light is transmitted through an optical fiber close to a sample. Excitation light outputted from the optical fiber is condensed by a coupling lens. Then, the condensed light is irradiated onto the sample. Fluorescence generated therefrom by the irradiation of the excitation light is coupled by the coupling lens to a light receiving optical fiber. A wavelength component necessary for the measurement is extracted by the optical filter from the fluorescence transmitted from the optical fiber. Light outputted from the light receiving optical fiber is converted by a first collimator lens to parallel light beams. Then, the parallel light beams are incident upon the optical filter. The component transmitted by the optical filter is condensed by a second collimator lens. Subsequently, the condensed component is coupled to the optical fiber again and is led to a photodetector, such as a photomultiplier or an avalanche photodiode.

Recently, in the field of fluorescence measurement devices, systems using a bundle of a large number of multimode optical fibers, which is called "an optical fiber bundle", as one optical transmission path have been increased to ensure a large diameter of an opening in the optical fiber and to assure flexibility required to treat an excess length part of each of optical fibers. However, the transmission system using such an optical fiber bundle has a problem that in the case of using the related optical fiber collimator, well-collimated light beams cannot be obtained.

The related optical fiber collimator is enabled to dispose the central axis of the collimator lens and that of the optical fiber on a same line. Fundamentally, a light beam outputted from the optical fiber can travel on the optical axis of the collimator lens. It has been sufficient to dispose the optical fiber and the collimator lens by taking only the conversion of the outputted light beam to parallel light beams into account. However, in a case where the central axis of an optical fiber 10a placed along the central axis of an optical fiber bundle 14 is set to coincide with that of a collimator lens 12 in the transmission system using an optical fiber bundle, as shown in FIG. 6B, the central axis of an optical fiber 10b placed at the periphery of the optical fiber bundle 14 cannot be set to coincide with that of the collimator lens 12. Thus, divergent light beams outputted from a large number of optical fibers 10b, which have optical axes shifted from the optical axis of the collimator lens 12 and are other than the central optical axis 10a, are converted by the collimator lens 12 to parallel light beams. Accordingly, even in a case where the divergent light beams outputted from each of the optical fibers 10b are converted to parallel light beams, a plurality of parallel light beams, the optical axis of each of which is shifted from the optical axis of the collimator lens 12, are generated. Consequently, well-collimated light cannot be obtained. Therefore, in the case of constituting a system in which an optical filter is inserted between a pair of collimator lenses, coupling loss is caused by light beams traveling obliquely with respect to the optical axis of each of the collimator lenses. Consequently, the optical coupling loss caused between a pair of collimator lenses is very large. Especially, in a case where the optical filter is a bandpass filter, the system has a poor cutoff characteristic, because the designed characteristic of a dielectric multilayer filter is deviated from a necessary cutoff characteristic for the light beams traveling obliquely with respect to the optical axis of the collimator lens.

SUMMARY OF THE INVENTION

A problem to be solved by the invention is to realize a collimator that exhibits a favorable collimating characteristic in a transmission system using an optical fiber bundle. Also, another problem to be solved by the invention is to realize an optical filter device, the loss characteristic and the spectral transmittance characteristic of which are stable, by using a transmission system that employs an optical fiber bundle. Still another problem to be solved by the invention is to realize an optical enabled to deal with a micro-amount of light with high precision.

According to an aspect of the invention, there is provided a collimator (hereunder referred to as a first collimator) adapted to convert divergent light beams outputted from an optical fiber bundle to parallel light beams through a collimator lens. In this collimator, a large diameter optical fiber is disposed between an optical fiber bundle, which is a bundle of a large number of multimode optical fibers and serves as one optical transmission path, and a collimator lens. A cross-section of a core of the large diameter optical fiber is larger than a range in which the cores of the optical fibers of the optical fiber bundle are present. A group of divergent light beams outputted from the optical fibers of the optical fiber bundle is converted by the large diameter optical fiber to one light beam.

An embodiment (hereunder referred to as a second collimator) of the first collimator is adapted so that a numerical aperture (NA) of the large diameter optical fiber is equal to or larger than a numerical aperture (NA) of each of the optical fibers of the optical fiber bundle, and that an end face of the optical fiber bundle is in mechanical contact with one of end faces of the large diameter optical fiber. An embodiment (hereunder referred to as a third collimator) of the first or second collimator is adapted so that a transversal cross-section of the core of the large diameter optical fiber is circular, that a diameter of the transversal cross-section of the core of the large diameter optical fiber is equal to or larger than a diameter of a circle circumscribing the transversal cross-sections of cores of optical fibers arranged on a circumference of a transversal cross-section of the optical fiber bundle, and that the large diameter optical fiber is wound by (½) turn or more at a radius of curvature that is equal to or larger than an allowable bending radius. According to an embodiment (hereunder referred to as a fourth collimator) of one of the first to third collimators, for example, one of the large number of optical fibers is located on the central axis of the optical fiber bundle. The remaining ones of the large number of the optical fibers are arranged on the circumference to surround the optical fiber located on the central axis of the optical fiber bundle.

According to another aspect of the invention, there is provided an optical filter device (hereunder referred to as a first optical filter device) configured so that an incidence side collimator and an output side collimator respectively having collimator lenses are disposed to face each other, and that an optical filter is inserted between the collimator lenses. One of the first to fourth collimators is used at least as the incidence side collimator. An embodiment (hereunder referred to as a second optical filter device) of the first optical filter device of the invention is configured so that the large diameter optical fiber is incorporated into the output side collimator. In the second optical filter device, a cross-section of a core of the large diameter optical fiber of the output side collimator, upon which a light beam outputted from the optical filter is incident, is similar in shape to a cross-section of a core of the large diameter optical fiber of the incidence side collimator outputting a light beam which is incident upon the optical filter. The area of the cross-section of the core of the large diameter optical fiber of the output side collimator is equal to or larger than the area of the cross-section of the core of the large diameter optical fiber of the incidence side collimator.

Additionally, the invention provides an optical measuring apparatus that includes the first or second optical filter device, an optical system adapted to make light, which is to be measured, incident on the optical filter device, and an optical system adapted to detect light outputted from the optical filter device.

According to the collimator of the invention, the large diameter optical fiber (light guide element) is inserted between the optical fiber bundle and the collimator lens. The diameter of the core of the large diameter optical fiber is set to be larger than a range in which all of the cores of the optical fibers are present. Thus, a group of divergent light beams outputted from the optical fiber bundle is efficiently incident upon the large diameter optical fiber. The light beams having been incident thereupon from the plurality of optical fibers are converted to a light beam when outputted from the large diameter optical fiber. Thus, favorably collimated light beams are obtained.

Also, the collimator according to the invention is adapted so that the numerical aperture (NA) of the large diameteroptical fiber is equal to or larger than a numerical aperture (NA) of each of the optical fibers of the optical fiber bundle, and that an end face of the optical fiber bundle is in mechanical contact with one of the end faces of the large diameter optical fiber. Thus, light beams outputted from the optical fiber bundle are more efficiently incident upon the large diameter optical fiber. Consequently, coupling efficiency is improved. Also, the collimator according to the invention may be adapted so that the large diameter optical fiber may be wound by (½) turn or more at a predetermined radius of curvature. Thus, as compared with the case where the large diameter optical fiber is linearly shaped, the distribution of the intensity of light beams can efficiently be shaped at a shorter length. Consequently, the invention can obtain an advantage in that the light distribution at the incidence of light beams can be substantially compensated by using such a short large-diameter optical fiber.

The collimator of the invention can efficiently transmit light beams outputted from a plurality of optical fibers of a optical fiber bundle, and can obtain favorably collimated light beams. Thus, the invention can realize an optical filter device that is most suitable for an optical measuring apparatus adapted to deal an extremely minute amount of light. Also, the invention can realize a high-performance optical measuring apparatus.

BRIEF DESCRIPTION OF THE DRAWINGS

FIGS. 3A to 3C are explanatory views illustrating an embodiment of a collimator according to the invention.

DETAILED DESCRIPTION OF THE PREFERRED EMBODIMENTS

Figure 1:
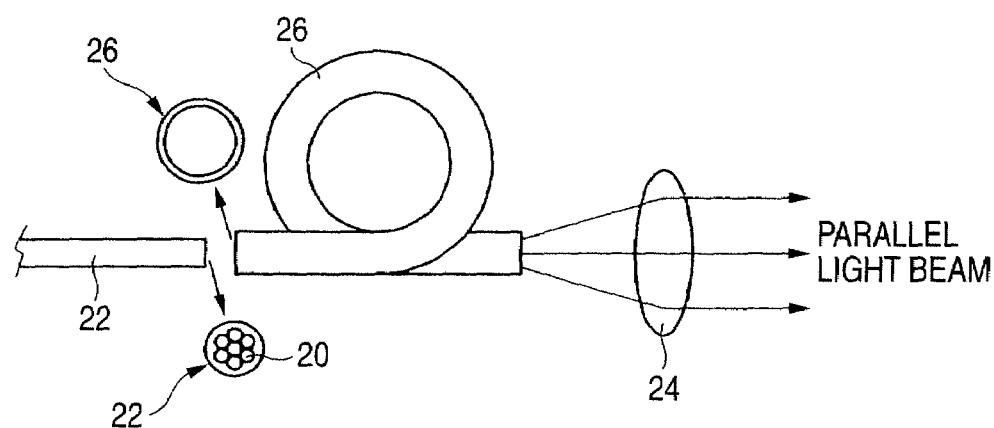
FIG. 1 is an explanatory view illustrating a typical example of a collimator according to the invention.

FIG. 1 shows a typical example of a collimator according to the invention. A large diameter optical fiber 26 is disposed between an optical fiber bundle 22, which is a bundle of a large number of multimode optical fibers 20 and serves as one optical transmission path, and a collimator lens. Consequently, divergent light beams outputted from each of the optical fibers 20 of the optical fiber bundle 22 are guided by the large diameter optical fiber 26. Then, the light beams are converted by the collimator lens 24 to parallel light beams. Incidentally, the cross-section of the core of the large diameter optical fiber 26 is set to be larger than a range in which the cores of the optical fibers 20 of the optical fiber bundle 22 are present. Consequently, light beams outputted from the optical fiber bundle can efficiently be incident upon the large diameter optical fiber. Thus, the coupling efficiency is improved. A light beam can be obtained by the large diameter optical fiber from a group of divergent light beams outputted from each of the optical fibers of the optical fiber bundle. That is, the large diameter optical fiber functions as an element adapted to mix a plurality of light beams having been incident thereupon. The light distribution of light beams outputted from the large diameter optical fiber is obtained by substantially compensating the light distribution at the incidence of light beams from the optical fiber bundle. Thus, favorably collimated light beams can be obtained.

The NA of the large diameter optical fiber is set to be equal to or larger than the NA of each of the optical fibers of the optical fiber bundle. Preferably, an end face of the optical fiber bundle is in mechanical contact with one of end faces of the large diameter optical fiber. Consequently, light beams outputted from the optical fiber bundle are efficiently incident upon the large diameter optical fiber. Thus, the coupling efficiency can be improved still more.

The transversal cross-section of the core of the large diameter optical fiber is set to be circular. The diameter of the transversal cross-section of the core of the large diameter optical fiber is set to be equal to or larger than the diameter of a circle circumscribing the transversal cross-sections of cores of optical fibers arranged on the circumference of the transversal cross-section of the optical fiber bundle. Also, preferably, the large diameter optical fiber is wound by (½) turn or more, further preferably, 1 turn at a radius of curvature that is equal to an allowable bending radius or is within twice the allowable bending radius. As a result of winding the large diameter optical fiber, the distribution of the intensity of light beams from the optical bundle can efficiently be shaped by a relatively short large-diameter optical fiber. The light distribution of light beams outputted from the large diameter optical fiber can be obtained to substantially compensate the light distribution at the incidence of light beams from the optical fiber bundle. Thus, favorably collimated light beams can be obtained. In the optimal condition of the collimated light beams substantially compensated, the collimated light beams meet the condition that the distribution of the intensity thereof is converted to a light intensity distribution symmetrical with an axis of symmetry, which is the central axis of the large diameter optical fiber, and that the intensity of light beams is high along the central axis of the large diameter optical fiber in the light intensity distribution. Due to the influence of the distribution of stress in the large diameter optical fiber, the oscillating condition, and the exciting condition, it is difficult to actually realize the optimal condition. However, preferably, the distribution of the intensity of light beams is made to be as close as to such an axially symmetrical light intensity distribution. More specifically, it is preferable that the light beam is brought into a high-energy excited state, which is coupled to a mode whose order is as low as possible.

The optical fiber bundle used in such a collimator has a structure configured as follows. That is, for example, one of the multimode optical fibers is located on the central axis of the optical fiber bundle. Also, the remaining multimode optical fibers are arranged to surround the optical fiber located on the central axis of the optical fiber bundle so that the transversal cross-sections of the remaining multimode optical fibers are disposed on a circumference of a circle. The entire optical fiber bundle is used as one optical transmission path by bundling the multimode optical fibers.

Figure 2:
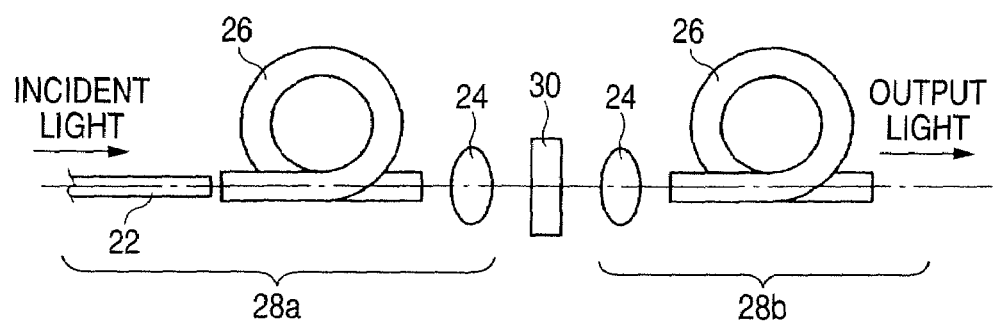
FIG. 2 is an explanatory view illustrating a typical example of an optical filter according to the invention.

FIG. 2 shows a typical example of an optical filter device according to the invention. This optical filter device is configured so that two collimators 28a, 28b respectively having collimator lenses 24 are disposed to face each other, and that an optical filter 30 is inserted between the collimator lenses. In this device, large diameteroptical fibers 26 are incorporated into the incidence-side collimator 28a and the output-side collimator 28b, respectively. In this case, the cross-section of the core of the large diameter optical fiber 26 of the output side collimator 28b, upon which a light beam outputted from the optical filter 30 is incident, is similar in shape to the cross-section of the core of the large diameter optical fiber 26 of the incidence side collimator 28a outputting a light beam which is incident upon the optical filter 30. The area of the cross-section of the core of the large diameter optical fiber 26 of the output side collimator 28b is set to be equal to or larger than the area of the cross-section of the core of the large diameter optical fiber 26 of the incidence side collimator 28a. Consequently, the optical coupling efficiency can be improved. Incidentally, the structure (or shape) and the functions of the incidence side collimator are the same as those described with reference to FIG. 1.

Incidentally, the large diameter optical fiber of the output side collimator is not indispensable. Light beams collected by the collimator lens may be incident directly upon a photodetector, such as a photomultiplier. However, to increase the flexibility of installation of equipment, it is better to guide light beams by the large diameter optical fiber. Light beams may be received by the large diameter optical fiber and also may be inputted to the photodetector. Alternatively, the light beams may be guided by using the optical fiber bundle. In either case, preferably, some kind of a light guide means including the large diameter optical fiber may be used at the output side.

EXAMPLE

FIGS. 3A to 3C is an explanatory view illustrating an example of the collimator according to the invention. Further, FIG. 3Aschematically shows the configuration of this collimator. FIG. 3B schematically shows light distributions obtained at different positions. FIG. 3C shows the distribution of the intensity of light, which is obtained at each of the different positions.

As shown in FIG. 3A, the optical fiber bundle 22 is configured as one optical transmission path by bundling a large number of the multimode optical fibers 20 (in this example, a total of 7 optical fibers, among which 6 optical fibers are disposed around the remaining 1 optical fiber at places symmetrical to one another to close to the central optical fiber) The incidence-side end faces of the optical fiber bundle 22 and the large diameter optical fiber 26 are placed close to each other so that effective coupling loss is minimized. Although the large diameter optical fiber 26 is drawn by omitting a middle portion thereof, the large diameter optical fiber 26 is actually an elongated light guide member having a length sufficient to the extent that a group of divergent light beams outputted from the optical fiber bundle is converted to one light beam. The output side end face of the large diameter optical fiber 26 is opposed to the collimator lens 24 and is placed at a position at which the divergent light beams outputted from the large diameter optical fiber 26 can most effectively be collimated.

FIG. 3B schematically shows the light distribution at each of (a) an end face of the optical fiber bundle, (b) an incidence side end face of the large diameter optical fiber, and (c) an output end face of the large diameter optical fiber. FIG. 3C shows the light intensity distributions in the direction of the diameter at these positions (a), (b), and (C), respectively. The collimator is configured, as shown in FIG. 3A. A group of light beams outputted from each of the optical fibers 20 of the optical fiber bundle 22 is diffused according to the NA of each of the optical fibers 20 and reach the incidence side end face of the large diameter optical fiber 26, at which the light beams are connected to the large diameter optical fiber 26. The light beams are converted to one beam during the light beams are propagated through the large diameter optical fiber 26. The obtained beam is outputted from the output side end face of the large diameter optical fiber 26. The length of the large diameter optical fiber 26 is set to be large, so that in a case where the large diameter optical fiber 26 is cylindrical, the light beam outputted from the large diameter optical fiber 26 has a light intensity distribution adapted to be symmetrical with an axis of symmetry, which is the central axis of the large diameter optical fiber 26, and to includes the intensity of light beams, which is high along the central axis of the large diameter optical fiber 26 in the light intensity distribution. The divergent light beams can be propagated on the optical axis of the collimator lens 24 by setting the central axes of the large diameter optical axis to coincide with each other. Desired collimated light beams can easily be obtained.

According to the present embodiment, a glass optical fiber, whose core diameter, outside diameter, and numerical aperture are 200 μm, 250 μm, and 0.2, respectively, is used each of the optical fibers of the optical fiber bundle. A plastic fiber, whose core diameter, outside diameter, and numerical aperture are 980 μm, 1000 μm, and 0.3, respectively, is used as the large diameter optical fiber, and is about 30 cm in length and is wound by 1 turn. A drum lens, which is 2.4 mm in diameter and is 1.5 mm in radius of curvature, is used as the collimator lens. The material of the lens is optical glass, whose refractive index Nd and Abbe's number Vd are 1.85 and 32.2, respectively, and is LaSFN9 manufactured and named by SCHOTT AG.

As a result of evaluating the coupling efficiency in a case where two of such collimators were disposed to face each other so that the distance between the collimator lenses was 15 mm, 65% was obtained as a value of the coupling efficiency. For comparison, the coupling efficiency was measured in a case where the end face of the optical fiber bundle was disposed at the same place as that of the output side end face of the large diameter optical fiber in the collimator of the present embodiment. An obtained value of the coupling efficiency was 45%. It was found that the use of the large diameter optical fiber increased the coupling efficiency by a factor of about 1.4.

According to the invention, it is important how the group of the light beams outputted from the optical fiber bundle is efficiently incident upon the large diameter optical fiber. Preferably, the diameter of the core of the large optical fiber is set to be larger than the size of a range, in which the group of the light beams is present, at a light receiving position. Therefore, to reduce the diameter of the large diameter optical fiber and to raise the brightness of light beams outputted from the output side end face of the large diameter optical fiber, it is most effective to place the incidence side end faces of the optical fiber bundle and the large diameter optical fiber are in mechanical contact with each other. Preferably, at that time, the diameter of the core of the large diameter optical fiber is within a range in which each of the cores of the optical fibers of the optical fiber bundle. In a case where the optical fiber bundle including 7 optical fibers is used in the present embodiment, preferably, the diameter of the core of the large diameter optical fiber is equal to or slightly larger than the diameter of a circle circumscribing the cores of the peripheral 6 optical fibers. To take all of the divergent light beams outputted from the optical fiber bundle into the core of the large diameter optical fiber, preferably, the NA of the large diameter optical fiber is set to be equal to or larger than the NA of each of the optical fibers.

It is often that the optical fiber bundle and the large diameter optical fiber are mechanically connected to each other by optical fiber connectors and optical receptacles, for example, FC connectors and SMA connectors. At that time, in consideration of mechanical tolerances, in a case where the optical fiber bundle using optical fibers, whose core diameter and clad diameter are 200 μm and 250 μm, respectively, preferably, the diameter of the core of the large diameter optical fiber is equal to or larger than 750 μm, in view of the fact that the optical fibers cannot be densely disposed in the optical fiber bundle. Also, preferably, the shape of the distribution of the refractive index is of the step index type that the NA of each of the peripheral optical fibers of the optical fiber bundle is not decreased in NA. The NA of the large diameter optical fiber is defined with respect to the spread of the light beam at the intensity of light, at which the NA is equal to (1/e) of a peak intensity. To obtain sufficient optical coupling, preferably, the NA of the large diameter optical fiber is larger than the NA of each of the optical fibers of the optical fiber bundle by 0.05 or so. For example, in the case of an optical fiber bundle including optical fibers, the NA of each of which is 0.2, preferably, the NA of the large diameter optical fiber is larger than 0.25. Additionally, in a case where there are plural of kinds of NAs of optical fibers of the optical fiber bundle, preferably, the NA of the large diameter optical fiber is larger than the value of the largest NA of the optical fiber by about 0.05.

According to the invention, it is important that light outputted from the output side end face of the large diameter is a light beam having one distribution of the intensity thereof (see FIG. 3C(c)). Thus, it is necessary to substantially compensate the distribution of the intensity of light beams at the incidence-side end face by propagating the light beams through the large diameter optical fiber. Also, it is necessary to set the length of the large diameter optical fiber at a relatively large value. More specifically, in a case where the large diameter optical fiber is linearly shaped, preferably, the length of the large diameter optical fiber is about 1m.

However, generally, it is usual that necessary performance is obtained by a short large-diameter optical fiber. In this case, the large diameter optical fiber is bent or wound to thereby enable that the efficient shaping of the distribution of the intensity of light beams is achieved by using a short large-diameter optical fiber. Preferably, the radius of curvature of the large diameter optical fiber is equal to the allowable bending radius of the used large diameter optical fiber. Also, preferably, the radius of curvature of the large diameter optical fiber is equal to or less than twice the allowable bending radius. Preferably, the number of winding the large diameter optical fiber is (½) turn or more (that is, a half turn or more). More specifically, in a case where the large diameter optical fiber is a plastic fiber, preferably, the length of the large diameter optical fiber ranges from about 30 cm to about 65 cm. Also, the large diameter optical fiber, the number of winding of which is 1 turn, is easy to use. In a case where the large diameter optical fiber is wound by (½) turn, the length of the large diameter optical fiber can be reduced to about 15 cm. Incidentally, in a case where the large diameter optical fiber is too long, it is difficult to accommodate the optical fiber in the device. Additionally, the loss increases. Therefore, preferably, the length of the large diameter optical fiber is about 2 m at a maximum.

Figure 4:
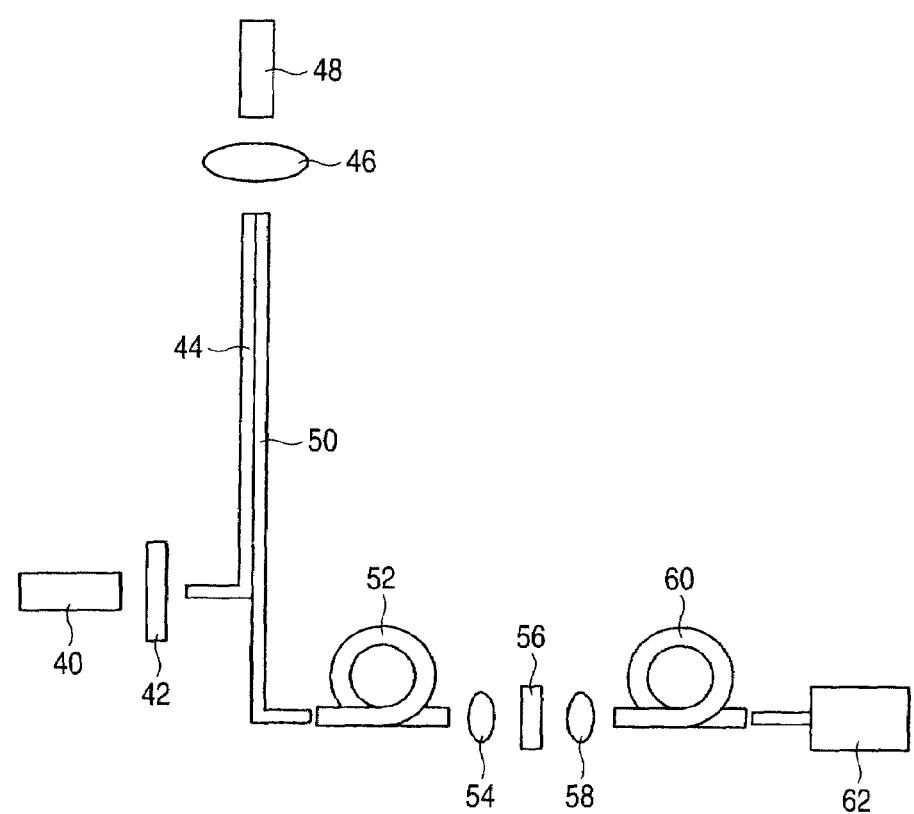
FIG. 4 is an explanatory view illustrating the configuration of an optical measurement apparatus incorporating an optical filter device according to the invention.

FIG. 4 shows an example of the configuration of an optical measuring apparatus incorporating the optical filter device according to the invention. A desired wavelength component is extracted by a bandpass filter 42 from light outputted from an excitation light source 40, and is employed as excitation light. The excitation light is transmitted to a place close to a sample through a sample by an optical fiber 44. The excitation light outputted from the optical fiber 44 is collected by the coupling lens 46 and is irradiated onto the sample 48.

Light (for example, fluorescence and phosphorescence) generated from the sample 48 by irradiating the sample 48 with the excitation light is coupled to a light receiving optical fiber bundle 50 by the coupling lens 46. After the light propagates through the light receiving optical fiber bundle 50, output light is incident upon a large diameter optical fiber 52 obtained by winding a single-core plastic fiber by 1 turn. Light beams outputted from each of the optical fibers of the light receiving optical fiber bundle 50 are converted to one light beam by the large diameter optical fiber 52. Then, the light beam outputted from the large diameter optical fiber 52 is converted by the first collimator lens 54 to parallel light beams. Subsequently, the parallel light beams are incident upon an optical filter 56. A component transmitted by the optical filter 56 is collected by a second collimator lens 58, and is coupled to a large diameter optical fiber 60 again. Thus, the component is led to the photodetector (photomultiplier) 62.

In a case where paired collimators are configured, although the same large diameter optical fibers may be used at both the incidence side and the output side, preferably, the diameter of the core of the output side large diameter optical fiber provided posterior to the optical filter is set to be larger than that of the core of the incidence side large diameter optical fiber.

Figure 5:
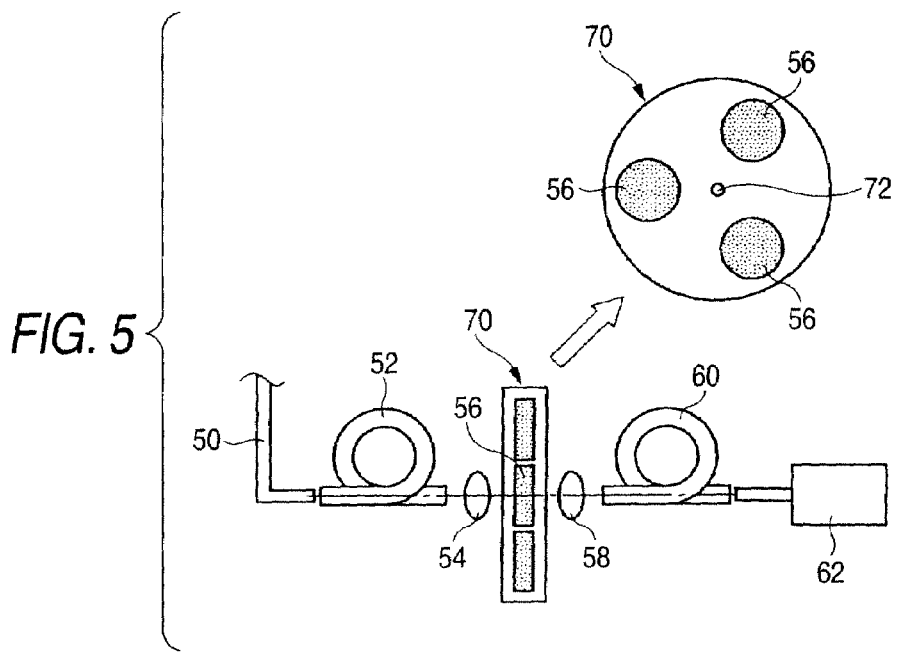
FIG. 5 is an explanatory view illustrating another example of the optical filter device.
Figure 6A:
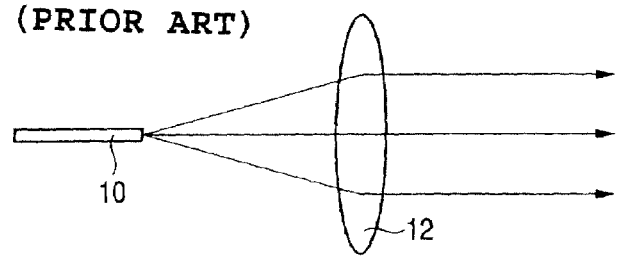
FIGS. 6A and 6B are explanatory views illustrating related art optical fiber collimators.
Figure 6B:
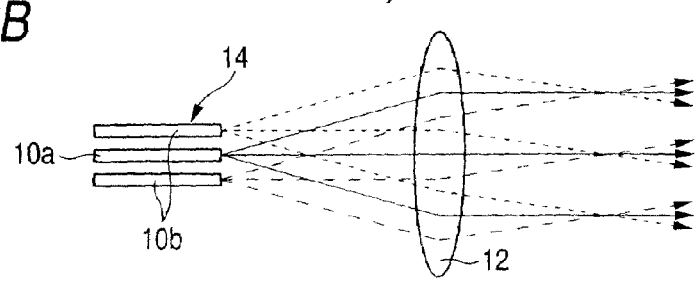

FIG. 5 shows another example of the optical filter device to be incorporated into the optical measuring apparatus. Basically, the optical filter device shown in FIG. 5 is similar to that shown in FIG. 4. Thus, members, which are the same as those shown in FIG. 4, are designated by the same reference numeral. The description of such members is omitted herein. The optical filter device shown in FIG. 5 is configured so that the optical filter can be changed among three kinds of optical filters. A filter holding plate 70 is disposed between a first collimator lens 54 and a second collimator lens 58. The filter holding plate 70 is enabled to rotate around a central shaft 72. The three kinds of optical filters 56 are attached to the filter holding plate 70. In this optical filter device, the optical filter 56, which is placed by turning the filter holding plate 70 at a position facing the collimator lens, is caused to act. Incidentally, the optical filters used in this device are, for example, wavelength selection filters utilizing interference due to dielectric multilayer film.

What is claimed is:

1. A collimator adapted to convert divergent light beams outputted from an optical fiber bundle to parallel light beams, comprising:
    a collimator lens;
    a large diameter optical fiber disposed between an optical fiber bundle having a large number of multimode optical fibers serving as one optical transmission path and the collimator lens;
    wherein a transversal cross-section of a core of said large diameter optical fiber is circular and has a diameter equal to or larger than a diameter of a circle circumscribing transversal cross-sections of cores of said optical fibers of said optical fiber bundle arranged on a circumference of a transversal cross-section of said optical fiber bundle, and wherein said large diameter optical fiber is wound by (½) turn or more at a radius of curvature that is equal to or larger than an allowable bending radius; and
    a group of divergent light beams outputted from said optical fibers of said optical fiber bundle is converted by said large diameter optical fiber to one light beam.

2. The collimator according to claim 1, wherein a numerical aperture (NA) of said large diameter optical fiber is equal to or larger than a numerical aperture (NA) of each of said optical fibers of said optical fiber bundle, and that an end face of said optical fiber bundle is in mechanical contact with one of end faces of said large diameter optical fiber.

3. The collimator according to claim 1, wherein one of the large number of said optical fibers is located on a central axis of said optical fiber bundle, and wherein the remaining ones of the large number of said optical fibers are arranged on a circumference of said one of the large number of said optical fibers to surround said optical fiber.

4. An optical filter device comprising:
    an incidence side collimator;
    an output side collimator facing to said incidence side collimator; and
    an optical filter inserted between said incidence side and output side collimators;
    wherein at least one of said incidence side collimator and said output side collimator includes a collimator, comprising:
    a collimator lens;
    a large diameter optical fiber disposed between an optical fiber bundle having a large number of multimode optical fibers serving as one optical transmission path and a collimator lens;
    wherein a cross-section of a core of said large diameter optical fiber is larger than a range in which cores of said optical fibers of said optical fiber bundle are present; and
    a group of divergent light beams outputted from said optical fibers of said optical fiber bundle is converted by said large diameter optical fiber to one light beam.

5. The optical filter device according to claim 4, wherein said large diameter optical fiber is incorporated into said output side collimator,
    wherein a cross-section of a core of said large diameter optical fiber of said output side collimator, upon which a light beam outputted from said optical filter is incident, is similar in shape to a cross-section of a core of said large diameter optical fiber of said incidence side collimator outputting a light beam which is incident upon said optical filter, and
    wherein the area of the cross-section of said core of said large diameter optical fiber of said output side collimator is equal to or larger than the area of the cross-section of said core of said large diameter optical fiber of said incidence side collimator.

6. An optical measuring apparatus, comprising:
    an optical filter device comprising:
    an incidence side collimator;
    an output side collimator facing to said incidence side collimator; and
    an optical filter inserted between said incidence side and output side collimators;

wherein at least said incidence side collimator and said output side collimator includes a collimator adapted to convert divergent light beams outputted from an optical fiber bundle to parallel light beams, comprising:

a collimator lens;

a large diameter optical fiber disposed between an optical fiber bundle having a large number of multimode optical fibers serving as one optical transmission path and a collimator lens;

wherein a cross-section of a core of said large diameter optical fiber is larger than a range in which cores of said optical fibers of said optical fiber bundle are present; and a group of divergent light beams outputted from said optical fibers of said optical fiber bundle is converted by said large diameter optical fiber to one light beam;

an optical system adapted to make light, which is to be measured, incident on said optical filter device; and an optical system adapted to detect light outputted from said optical filter device.

7. An optical filter device comprising:

an incidence side collimator and an output side collimator each of said incidence side collimator and output side collimator comprising:

an optical fiber bundle consisting of a bundle of a large number of multimode optical fibers serving as one optical transmission path;

a collimator lens; and a large diameter optical fiber disposed between the optical fiber bundle and the collimator lens, a transversal cross-section of the core of the large diameter optical fiber being circular, a diameter of the transversal cross-section of the core of the large diameter optical fiber being equal to or larger than a diameter of a circle circumscribing the transversal cross-sections of cores of optical fibers arranged on a circumference of a transversal cross-section of the optical fiber bundle, and the large diameter optical fiber being wound by (½) turn or more at a radius of curvature that is equal to or larger than an allowable bending radius; and an optical filter disposed between collimator lenses of said incidence side collimator and said output side collimator to receive a light beam from the from the incidence side collimator and pass a filtered light beam to the output side collimator.

8. The optical filter device according to claim 7, wherein the first collimator is adapted so that a numerical aperture (NA) of the large diameter optical fiber is equal to or larger than a numerical aperture (NA) of each of the optical fibers of the optical fiber bundle, and that an end face of the optical fiber bundle is in mechanical contact with one of end faces of the large diameter optical fiber.

9. The optical filter device according to claim 8, wherein one of the large number of optical fibers is located on the central axis of the optical fiber bundle and remaining ones of the large number of the optical fibers are arranged on the circumference to surround the optical fiber located on the central axis of the optical fiber bundle.

10. The optical filter device according to claim 7, wherein the optical filter is mounted in filter holding plate with one or more addition optical filters, the filter holding plate being rotatable to selectively dispose a selected one of the optical filters between collimator lenses of said incidence side collimator and said output side collimator.

11. The optical filter device according to claim 7, wherein the diameter of the core of the output side large diameter optical fiber provided posterior to the optical filter is larger than the diameter of the core of the incidence side large diameter optical fiber.

12. The optical filter device according to claim 7, further comprising a photodetector disposed to receive output light from said output side collimator.

* * * * *